3,741,915
SULFONATE DETERGENTS
Stanley C. Paviak, Shaler Township, Allegheny County, Pa., assignor to Gulf Research & Development Company, Pittsburgh, Pa.
Filed May 14, 1971, Ser. No. 143,363
Int. Cl. C11d 1/14
U.S. Cl. 252—555
4 Claims

ABSTRACT OF THE DISCLOSURE

An aqueous composition of matter containing sodium alkene sulfonates or sodium hydroxy alkane sulfonates and an alkali metal sulfate in an amount sufficient to increase the viscosity thereof.

---

This invention relates to an aqueous composition of matter containing sodium alkene sulfonates, sodium hydroxy alkane sulfonates or mixtures thereof whose viscosity has been increased by the addition thereto of a selected amount of an alkali metal sulfate, such as sodium, potassium or ammonium sulfate. These compositions have utility in those areas generally designated for light-duty liquid detergents and liquid hair shampoos.

The sodium sulfonates in the new composition herein can be defined as sodium alkene sulfonates, sodium hydroxy alkane sulfonates or any combination thereof, for example, wherein the weight ratio between the two can be from about 9:1 to about 3:7, preferably from about 1:1 to about 7:3, having from 12 to 18 carbon atoms in the molecule, preferably having from 14 to 16 carbon atoms in the molecule.

The sodium sulfonates in the new composition herein can be obtained from any source, but, preferably, are obtained by reacting an alpha olefin having from 12 to 18 carbon atoms, preferably from 14 to 16 carbon atoms, with $SO_3$, to obtain a sulfonated addition product thereof, and thereafter the sulfonation product is reacted with sodium hydroxide to obtain a product predominating in the corresponding sodium alkene sulfonates and sodium hydroxy alkane sulfonates having the same number of carbon numbers as the reactant olefin.

The reaction of the normal alpha olefin with $SO_3$ in the first stage and the subsequent treatment of the sulfonated addition product with sodium hydroxide in the second stage can be carried out in any conventional manner, but in a preferred embodiment are carried out as follows. In the first stage $SO_3$ and an alpha olefin, or a mixture of olefins, for example, dodecene-1, tridecene-1, tetradecene-1, pentadecene-1, hexadecene-1, heptadecene-1 or octadecene-1, wherein the molar ratio of $SO_3$ to said olefin is maintained, for example, within a range of about 0.85 to about 1.15 mols of $SO_3$ per mole of olefin, preferably within a range of about 0.98 to about 1.05 mol of $SO_3$ per mol of olefin. In order to help moderate the temperature within the reaction zone, a temperature regulated thin-film type reactor is employed and the $SO_3$ is introduced therein in admixture with a dry, inert gas, such as nitrogen, air, helium, $SO_2$, $CO_2$, etc. Volume percent of $SO_3$ in the incoming gaseous stream can be maintained within a range of about one to about 20 percent, preferably within a range of about three to about 10 percent. The temperature in the reaction zone can be from about 0° to about 100° C., but preferably from about 20° to about 60° C. The pressure can be, for example, from about atmospheric to about 50 pounds per square inch gauge, preferably from about five to about 15 pounds per square inch gauge.

The time required for reaction between the olefin and $SO_3$ is difficult to define, since the reaction is exceedingly fast. In practice, the reaction zone is so designed and the flow of reactants therethrough is so adjusted that as soon as reaction between the $SO_3$ and the olefin is effected the sulfonation product resulting from such reaction is removed from the reaction zone. In general, the residence time of the sulfonation product can be, for example, less than about 120 seconds, preferably from about 0.1 to about 60 seconds.

The sulfonated addition product obtained above can then be cooled to a temperature of about 15° to about 30° C. and the pressure reduced, for example, to about one atmosphere. Inert gases and any unreacted $SO_3$ present are removed from the reaction mixture and can be recycled, if desired, to the first stage of the process. The product is then treated in a hydrolysis step with a molar equivalent of sodium hydroxide, based on the molar amount of $SO_3$ employed, plus from about one to about 10 mol percent excess in sufficient water to yield a final sulfonate solution of from 10 to about 50 percent, at a temperature of about 50° to about 200° C., preferably about 95° to about 175° C., and a pressure of about atmospheric to about 240 pounds per square inch gauge, for a period sufficient for the addition product to be completely neutralized.

The composition thus obtained can contain (1) from about 20 to about 80 percent by weight, generally from about 30 to about 70 percent by weight, of double bond positional isomers of water-soluble sodium alkene-1 sulfonic acids, including the alpha-beta, beta-gamma and gamma-delta unsaturated isomers thereof; and (2) from about 10 to about 70 percent by weight, generally from about 20 to about 60 percent by weight, of a mixture of water-soluble sodium salts of aliphatic compounds containing hydroxy and sulfonate radicals, with the sulfonate radical being on the terminal carbon and the hydroxyl radical being greater than two carbons away from said terminal carbon atom. There may also be present in an amount that can be from about two to about 20 percent by weight of the composition, but generally in the range of about five to about 15 percent thereof, a mixture of water-soluble sodium salts of alkene disulfonates and water-soluble sodium salts of hydroxy alkane disulfonates. Each of these sulfonates will also carry the same number of carbon atoms as the reactant olefin. Minor amounts of other species resulting from this reaction may also be present.

The sodium alkene sulfonates or the sodium hydroxy alkane sulfonates defined above, and particularly the mixture of sodium salts of the addition product of $SO_3$ with an alpha olefin defined above, are known to possess excellent detergency properties. A convenient form in which these detergents are used is as an aqueous solution thereof, wherein the sodium salt or mixture of sodium salts amounts to about 10 to about 50 percent by weight thereof, preferably from about 20 to about 35 percent by weight thereof. Although the detergency properties of these solutions are excellent they are very fluid. Lacking "body" these solutions are unattractive to consumers because of their watery consistency. Additives widely known to improve the viscosity of detergent solutions, such as small amounts of sodium chloride and the class of surfactants known as "alkanolamides," were found ineffective for this particular sulfonate composition.

I have found that the viscosity of such detergents can be increased without adversely affecting the desired detergency characteristics thereof by the simple expedient of adding thereto a selected amount of an alkali metal sulfate. Although the amount of alkali metal sulfate added to the aqueous solution of sodium alkene sulfonates, sodium hydroxy alkane sulfonates or mixtures thereof will depend upon the initial viscosity of the aqueous solution, which in turn depends upon the amount of sodium sulfonate therein, and the ultimate viscosity desired, in general, the amount of alkali metal sulfate added is such that the composition will contain the following, in percent by weight: about 25 to about 90 percent water, about five to about 50 percent sulfonate(s), and about five to about 25 percent alkali metal sulfate, but preferably as follows: about 47 to about 83 percent water, about 10 to about 35 percent sulfonate(s), and about seven to about 18 percent alkali metal sulfate. The balance of this composition can include other additives which improve the performance of the sulfonate composition as is often required of detergent formulations and known to those skilled in the art. The viscosity of the initial aqueous solution will generally be in the range of about five to about 50 centistokes, measured at room temperature. In a preferred embodiment the viscosity of the aqueous solution is raised to at least about 50 centistokes by the addition thereto of an alkali metal sulfate, and in an especially preferred embodiment the viscosity of the ultimate composition herein is in the range of about 100 to about 5000 centistokes.

The invention defined and claimed herein can be further illustrated by the following. A sodium alpha olefin sulfonate was obtained by a procedure which involved bringing into contact a mixture containing two parts by weight of tetradecene-1 and one part by weight of hexadecene-1 with a gaseous mixture containing $SO_3$ and an inert gas, wherein the molar ratio of said $SO_3$ to said combined alpha olefins was about 1.05:1, and then treating the resulting addition product of said olefins and said $SO_3$ with an aqueous sodium hydroxide solution to obtain a detergent mixture predominating in the corresponding sodium alkene sulfonates and sodium hydroxy alkane sulfonates of said reactant olefins. The product so obtained was diluted with water to obtain aqueous solutions thereof wherein the sodium sulfonates constituted, respectively 10, 19 and 30 percent by weight thereof. Sodium sulfate in selected amounts was added to each of the solutions so prepared. Viscosity measurements were made of each of the initial aqueous solutions and of those to which sodium sulfate was added. Viscosity measurements were made at room temperature by the use of a Gardner Bubble Viscometer wherein the samples were matched with standards of known viscosity. The approximate viscosity was obtained in centistokes (cs.) and conversion thereof to centipoises (cp.) can be obtained by multiplication of the value obtained by the density of the sample.

The data obtained are plotted in the attached drawing wherein Curve I represents viscosities of the 10 percent aqueous sulfonate solution, Curve II of the 19 percent and Curve III of the 30 percent. Viscosities of the initial aqueous solutions alone do not increase drastically with concentration as shown by values of 6, 6 and 14 for the initial 10, 19 and 30 aqueous solutions, respectively. With the 19 percent aqueous solution a significant increase in viscosity was not obtained until the sodium sulfate content of the solution exceeded about eight percent. A viscosity of about 100 centistokes was achieved at a sodium sulfate content of about 12.5 percent. The viscosity of the 10 percent solution was similarly increased by larger amounts of sodium sulfate. When an amount of sodium sulfate in excess of about 19 percent was added to the aqueous solution some crystallization occurred, but this was easily eliminated by warming the solution. Because resistance to precipitation is desired for products in this application all of these solutions were chilled to about 4° to 8° C. overnight and no separation occurred. Upon freezing of the 19 percent sulfonate solutions and permitting them to attain room temperature, all recovered to clear solutions, except the one containing 14 percent sodium sulfate, which required some warming. Higher active ingredient solutions also recovered after freezing, whereas the more dilute ones require some warming.

An alkali metal sulfate is believed to be unique in the context in which the same is employed herein. For example, I have added sodium chloride and magnesium sulfate, separately, to 19 percent aqueous sulfonate solutions. Not only was the viscosity thereof not significantly increased, even at the five percent addition level, but the salt precipitated upon chilling the solutions.

Although the composition herein has been defined as containing alkali metal sulfonates and alkali metal sulfates, it is understood that the same can also include other ingredients that may be required for commercial purposes, such as alkanolamides as foam modifiers, other surfactants and minor amounts of colorants, opacifiers, perfumes, buffers, etc.

Although I have shown herein that the addition of an alkali metal sulfate to sodium alkene sulfonates and/or sodium hydroxy alkane sulfonates will increase the viscosity of said sulfonates, the same improvement will also be obtained when said sulfate is added to the corresponding potassium, ammonium and magnesium sulphonates, since the beneficial effect obtained herein resides with the anionic portion of the surfactant.

Obviously, many modifications and variations of the invention, as hereinabove set forth, can be made without departing from the spirit and scope thereof, and therefore only such limitations should be imposed as are indicated in the appended claims.

I claim:

1. An aqueous composition of matter consisting essentially of (1) about 47 to about 83 percent by weight of water, (2) about 10 to about 35 percent by weight of sodium sulfonates, defined hereinafter and (3) about five to about 18 percent by weight of an inorganic sulfate selected from the group consisting of sodium, potassium and ammonium sulfates, said amount of inorganic being sufficient to increase the viscosity of a mixture of said amount of water and said amount of sodium sulfonates, said sodium sulfonates having been obtained by reacting from about 0.85 to about 1.15 mols of $SO_3$ with about one mol of an alpha olefin having from 12 to 18 carbon atoms at a temperature of about 0° to about 100° C. over a period of about 0.1 to about 60 seconds to obtain a sulfonation addition product, hydrolyzing and neutralizing said sulfonation addition product with sodium hydroxide in water at a temperature of about 50° to about 200° C., resulting in the production of a mixture consisting essentially of sodium alkene sulfonate, sodium hydroxy alkane sulfonates, sodium alkene disulfonates and sodium hydroxy alkane disulfonates, each having from 12 to 18 carbon atoms, said latter mixture constituting the sodium sulfonates of the first-mentioned aqueous composition of matter.

2. The composition of claim 1 wherein the alpha-olefin used in preparing said sodium sulfonates has from 14 to 16 carbon atoms.

3. The composition of claim 1 wherein said inorganic sulfate is sodium sulfate.

4. The composition of claim 3 wherein said inorganic sulfate is sodium sulfate.

References Cited

UNITED STATES PATENTS 3,708,437  1/1973  Sweeney _____ 252—555

MAYER WEINBLATT, Primary Examiner

P. E. WILLIS, Assistant Examiner

U.S. Cl. X.R.

252—536